United States Patent [19]
Michioka et al.

[11] Patent Number: 5,647,816
[45] Date of Patent: Jul. 15, 1997

[54] AUTOMATIC TRANSMISSION

[75] Inventors: Hirofumi Michioka, Fujisawa; Masahiro Yamamoto, Atsugi; Koichi Hayasaki, Hiratsuka; Yoshinori Mikoshiba, Yokohama, all of Japan

[73] Assignee: Nissan Motor Co., Ltd., Yokohama, Japan

[21] Appl. No.: 436,615

[22] Filed: May 8, 1995

Related U.S. Application Data

[62] Division of Ser. No. 10,811, Jan. 29, 1993, Pat. No. 5,439,088.

[30] Foreign Application Priority Data

| Jan. 30, 1992 | [JP] | Japan | 4-15290 |
| Jan. 30, 1992 | [JP] | Japan | 4-15291 |
| Jan. 30, 1992 | [JP] | Japan | 4-15292 |
| Jan. 30, 1992 | [JP] | Japan | 4-15293 |
| Jan. 30, 1992 | [JP] | Japan | 4-15294 |

[51] Int. Cl.$^6$ ............................................. F16H 47/08
[52] U.S. Cl. ............................................. 475/285; 475/331
[58] Field of Search ............................................. 192/48.92, 85 AA; 475/269, 275, 274, 287, 285, 296, 297

[56] References Cited

U.S. PATENT DOCUMENTS

| 2,690,248 | 9/1954 | McDowell | 192/113 |
| 2,726,748 | 12/1955 | Quistgaard | 192/85 |
| 2,939,558 | 6/1960 | Schjolin | 192/3.6 |
| 3,224,539 | 12/1965 | Hansel | 192/86 |
| 3,581,858 | 6/1971 | Haley | 192/106 |
| 3,642,107 | 2/1972 | Borman et al. | 192/103 |
| 3,823,802 | 7/1974 | Winzeler et al. | 192/113 |
| 4,509,627 | 4/1985 | Kawamoto | 192/85 F |
| 4,732,253 | 3/1988 | Hiramatsu et al. | 192/87.11 |
| 4,805,752 | 2/1989 | Malloy et al. | 192/85 AA |
| 4,957,195 | 9/1990 | Kano et al. | 192/106 F |
| 4,964,506 | 10/1990 | Benford et al. | 192/106 F |
| 5,029,685 | 7/1991 | Takase et al. | 192/48.91 |
| 5,172,799 | 12/1992 | Iijima et al. | 192/106 F |
| 5,178,588 | 1/1993 | Hashimoto et al. | 475/285 X |
| 5,213,552 | 5/1993 | Ito | 475/285 X |
| 5,224,907 | 7/1993 | Shirataki | 475/285 X |
| 5,232,911 | 8/1993 | Hayashi et al. | 475/146 |
| 5,348,518 | 9/1994 | Taniguchi et al. | 475/285 |

FOREIGN PATENT DOCUMENTS

| 0 282 169 | 9/1988 | European Pat. Off. . |
| 0 329 408 | 8/1989 | European Pat. Off. . |
| 0 454 866 A1 | 11/1991 | European Pat. Off. . |
| 677 960 | 7/1939 | Germany . |
| 6910124 | 3/1969 | Germany . |
| 2 220 985 | 12/1972 | Germany . |
| 30 16 992 | 11/1980 | Germany . |

OTHER PUBLICATIONS

Nissan Repair Manual RE4R01A, pp. 1–7, 1987.
Nissan Repair Manual RE4F02A, pp. 1–6, 1988.
Nissan Repair Manual RE5R01A, pp. 1–2 and 78, 79, 1989.

*Primary Examiner*—Khoi Q. Ta
*Attorney, Agent, or Firm*—Foley & Lardner

[57] ABSTRACT

An automatic transmission is provided with at least one friction element and a piston. The engagement of the friction element is proceeded in a manner that operating pressure is applied to an apply chamber to stroke the piston. The disengagement of the friction element is proceeded in a manner that operating pressure is applied to a cancel chamber to stroke the piston. The cancel chamber is disposed opposite to the apply chamber with respect to the piston and formed such that an outer diameter of a pressure receiving surface of said cancel chamber is generally the same as that of said apply chamber. Therefore, piston pushing force due to centrifugal force in the apply chamber is balanced with a piston reversely pushing force due to the centrifugal force in the cancel chamber. This prevents the friction element from being dragged during friction element disengaged condition.

4 Claims, 6 Drawing Sheets

| RANGE | | L/C | B/B | H/C | RD/B | D/C | LR/B | L/OWC | R/C |
|---|---|---|---|---|---|---|---|---|---|
| R | | | | | | | ○ | | ○ |
| P, N | | | | | | | | | |
| D / 1st | | ○ | | | ○ | | ○ | | |
| 3 / 2nd | | ○ | ○ | | ○ | | △ | | |
| 2 / 3rd | | ○ | | ○ | ○ | | | RACING | |
| 1 / 4th | | ○ | | ○ | ○ | ○ | | RACING | |
| 5th | | | ○ | ○ | | ○ | | RACING | |

AUTOMATIC TRANSMISSION

This application is a division of application Ser. No. 08/010,811, filed Jan. 29, 1993 now U.S. Pat. No. 5,439,088.

BACKGROUND OF THE INVENTION

The present invention relates to improvements in an automatic transmission for an automotive vehicle, and more particularly to an automatic transmission which is imporved in structure and performance.

U.S. Pat. No. 3,581,858 discloses a conventional automatic transmission in which a clutch unit is arranged such that a cancel chamber is disposed to be opposite to an apply chamber relative to a piston for changing an operating condition of a cltuch. The cancel chamber is formed such that a pressure receiving surface is different from that of the apply chamber. This arrangement is not sufficient to actuate a piston pushing force due to centrifugal force pressure in the apply chamber by that in the cancel chamber.

SUMMARY OF THE INVENTION

It is an object of the present invention to provide an improved automatic transmission which can prevent a friction element from being dragged due to centrifugal force generated in an apply chamber of the firciton element.

It is another object of the present invention to provide an imporved automatic transmission by which a shifting operation is improved in speed and feeling.

According to an aspect of the present invention, there is provided an automatic transmission for an automotive vehicle, an automatic transmission processes a shifting operation by engagement and disengagement of a friction element which is disposed around a transmission shaft drivingly connected to an engine crankshfat. The automatic transmission comprises a piston which pushes the friction element for the engagement. An apply chamber is arranged such that operating pressure is applied thereto and strokes the piston for the engagement of the friction element. A cancel chamber, to which operating pressure is applied to stroke the piston for the diengagement of the friciton element, is disposed opposite to said apply chamber with respect to said piston. The cancel chamber is formed such that an outer diameter of a pressure receiving surface of said cancel chamber is the same as that of the apply chamber.

According to another aspect of the present invention, there is provided an automatic transmission for an automotive vehicle, the automatic transmission hainvg a plurality of friction elements proceses a shifting operation in a manner to engage one of the friction elements and to disengage another one of the friction elements. The friction element is disposed around a transmission shaft drivingly connected to an engine crankshaft. The automatic transmission comprises a piston which pushes the one friction element for the engagement. A first apply chamber is arranged such that operating pressure is applied thereto to stroke the piston for the engagement of the first friction element. A cancel chamber is arranged such that disengagement pressure for disengaging the another friction element to be disengaged is applied thereto. The cancel chamber is disposed opposite to the first apply chamber with respect to said piston. The cancel chamber is formed such that an outer diameter of a pressure receiving surface of the cancel chamber is the same as that of the apply chamber. A second apply chamber is arrnanged such that engagement pressure for engaging the another friction element to be engaged is applied thereto. A passage communicates with the cancel chamber and the second apply chamber.

BRIEF DESCRIPTION OF THE DRAWINGS

In the drawings, like reference numerals designate like parts and elements throughout all figures, in which.

DETAILED DESCRIPTION OF THE INVENTION

Referring to the drawings, preferred embodiments of the present invention will be described.

Figure 1A:
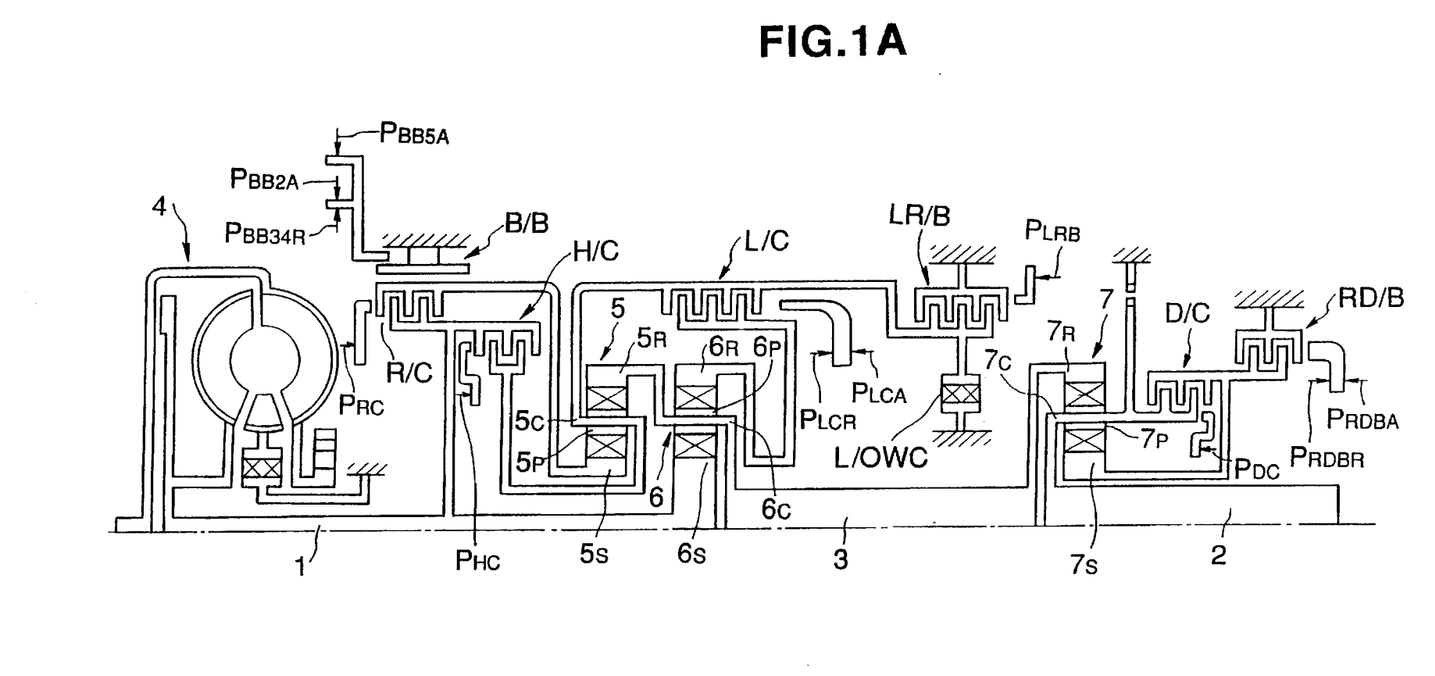
FIG. 1A is a skeleton drawing showing an embodiment of an automatic transmission according to the present invention.

Referring now to FIGS. 1A, 1B, 2, 3 and 4, there is shown an embodiment of an automatic transmission according to the present invention. As shown in FIG. 1A, the automatic transmission is provided with an input shaft 1, an output shaft 2 and an intermediate shaft 3 which are coaxially aligned such that the intermediate shaft 3 is disposed between and butted against the input and output shafts 1 and 2. The input shaft 1 is drivingly connected to an engine crankshaft (though not shown) through a torque converter 4. A first planetary gear set 5 and a second planetary gear set 6 are aligned in tandem with each other and coaxially disposed around the input shaft 1. A third planetary gear set 7 is coaxially disposed around the output shaft 2.

The first and second planetary gear sets 5 and 6 are simple gear sets and provided with first and second sun gears 5S, 6S, first and second ring gears 5R and 6R which are engaged with first and second pinions 5P and 6P, respectively. The first and second pinions 5P and 6P are rotatably supported to first and second carriers 5C and 6C, respectively. Similarly, the third planetary gear set 7 is a simple gear set and provided with a third sun gear 7S and a third ring gear 7R which are engaged with third pinion 7P. The third pinion 7P is rotatably supported to a third carrier.

The first sun gear 5S is fixable by a band brake B/B and connectable with the input shaft 1 by a reverse clutch R/C. The first carrier 5C is connectable with an input shaft 1 by a high-clutch H/C, and prevented by a low one-way clutch L/OWC from rotating in the reverse direction to the rotating direction of the input shaft 1. Furthermore, the first carrier 5C is fixable by a low reverse brake LR/B and connectable with the second ring gear 6R by a low clutch L/C. The second sun gear 6S is integrally connected to the input shaft 1, and the second carrier 6C is integrally connected to the first ring gear 5R and the intermediate shaft 3.

The intermediate shaft 3 is integrally connected to the third ring gear 7R, and the third carrier 7C is connected to the input shaft 2. The third carrier 7C is connectable with the third sun gear 7S by a direct clutch D/C. The third sun gear 7S is fixable by a reduction brake RD/B.

Figure 1B:
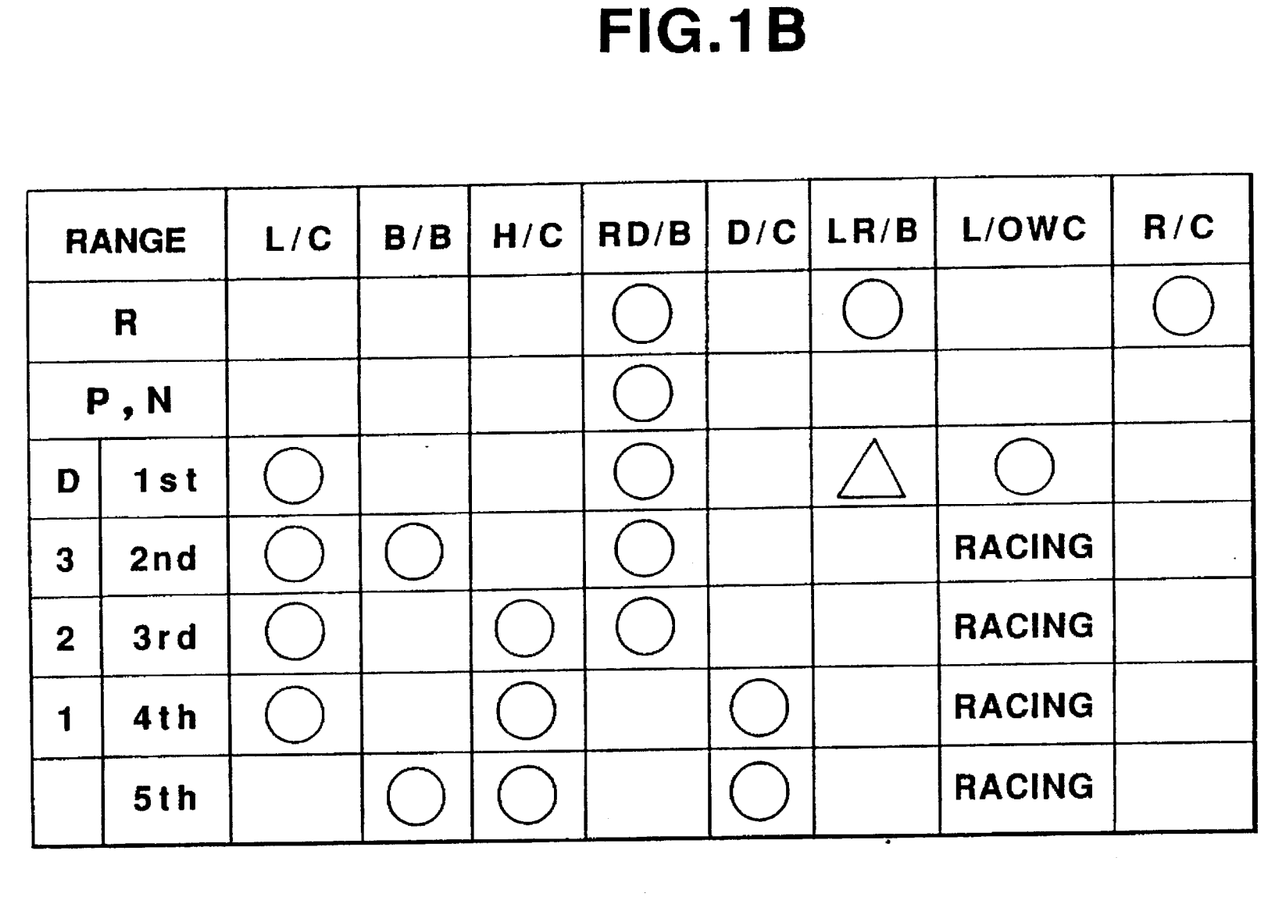
FIG. 1B is a table showing an engagement logic of friction elements.

The above-mentioned transmission can select forward first speed to fifth speed, reverse and parking by operating the above-mentioned clutch(es) and brake(s) into a combination (cell with a circle) shown in a table of FIG. 1B, at a range which is manually selected according to a desired running mode (includes parking) by a driver.

That is to say, when P range is selected according to a driver's request for parking or N range selected according to a driver's request for stopping, only the reduction brake RD/B is engaged. Accordingly, the third sun gear 7S is fixed, and the rotating power of the intermediate shaft 3 is reducingly transmitted to the output shaft 2 through the third ring gear 7R, the third pinion 7P and the third carrier 7C. With this selection, the third planetary gear set 7 is set in a reducing transmission condition, and all of the friction elements in relation with the first and second planetary gear sets 5 and 6 are not engaged. Accordingly, no rotating power of the input shaft 1 is transmitted to the intermediate shaft 3, and therefore the automatic transmission accomplishes a parking or stopping state in which the output shaft 2 is not rotated.

When D range is selected according to a driver's request for forward cruising, 3 range is selected according to a driver's request for third-speed engine-brake operating cruising, 2 range is selected according to a driver's request for second speed engine brake operating cruising, or 1 range is selected according to a driver's request for first-speed engine-brake operating cruising, the reduction brake RD/B is engaged and the low clutch L/C is engaged. With the engagement of the reduction brake RD/B, the third planetary gear set 7 is set in the reducing transmission condition as mentioned above. With the engagement of the low clutch L/C, the second ring gear 6R is prevented by the low one-way clutch LOW/C from rotating in the reverse direction to the rotating direction of the input shaft 1. Accordingly, the rotating power transmitted from the input shaft 1 to the second sun gear 6S rotatingly moves the second pinion 6P within the second ring gear 6R and reducingly rotates the second carrier 6C in the same direction as the rotating direction of the input shaft 1. The rotation of the second carrier 6C is transmitted to the intermediate shaft 3 and further reduced in rotating speed by the third planetary gear set 7. This reduced rotating power is transmitted to the output shaft so as to obtain forward 1st speed.

When, in first speed, the second carrier 6c is reversely driven at a high speed in the same direction as the rotating direction of the input shaft 1, such a reverse driving force is not transmitted to the input shaft 1 due to the disengagement of the low one-way clutch LOW/C, and the engine-brake is not generated. When an engine-brake operating cruising is requested in 1 range, it is necessary to forbid the disengagement of the low one-way clutch LOW/C by operating the low reverse brake LR/B as indicated by a triangle within a cell in the table of FIG. 1B.

When the cruising condition forces a selection of second speed, the reduction brake RD/B, the low clutch L/C and the band brake B/B are engaged. With the engagement of the reduction brake RD/B, the third planetary gear set 7 is set in a reducing transmission condition. On the other hand, with the engagement of the low clutch L/C and the band brake B/B, the first sun gear 5S is fixed by the band brake B/B so as to receive a reaction force. The rotation of the second ring gear 6R is transmitted to the first carrier 5C via the low clutch L/C and further transmitted to the first ring gear 5R by rotatingly moving the first pinion 5P around the first sun gear 5S. Accordingly, the second carrier 6C and the intermediate shaft 3 increase their right rotating speed, and therefore second speed is obtained.

When the cruising condition forces a selection of third speed, the reduction brake RD/B, the low clutch L/C and the high clutch H/C are engaged. With the engagement of the reduction brake RD/B, the third planetary gear set 7 is set in a reducing transmission condition. On the other hand, with the engagement of the low clutch L/C and the high clutch H/C, the second ring gear 6R is rotated with the input shaft 1. Accordingly, the second sun gear 6S integrally connected with the input shaft 1 is integrally rotated with the second ring gear 6R. This enables the intermediate shaft 3 to be rotated at the same speed as that of the input shaft 1, and therefore third speed is selected.

When the cruising condition forces a selection of fourth speed, the friction elements in relation with the first and second planetary gear sets 5 and 6 are engaged so as to be the same combination as that of third speed, and the direct clutch D/C in relation with the third planetary gear set 7 is engaged. With the engagement of the direct clutch D/C, the third sun gear 7S is connected to the third carrier 7C, and the third planetary gear set 7 is set in a direct transmission state in which all the friction elements are integrally rotated. Accordingly, the rotating speed of the intermediate shaft 3 is directly transmitted to the output shaft 2 without the reduction of rotating speed, and upshift from third to fourth speed is carried out.

When the cruising condition forces a selection of fifth speed, the direct clutch D/C, the band brake B/B and the high clutch H/C are engaged. With the engagement of the direct clutch D/C, the third planetary gear set 7 is set in a direct transmitting condition. On the other hand, with the engagement of the band brake B/B and the high clutch H/C, the first carrier 5C is rotated with the input shaft 1, and the first sun gear 5S is fixed. Accordingly, the first pinion 5P is rotatingly moved around the first sun gear 5S, and therefore the first ring gear 5R, the second carrier 6C and the intermediate shaft 3 which are integrally connected with each other are rotated. This enables fifth speed to be selected.

When R range is selected according to a driver's request for reverse cruising, the reduction brake RD/B, the low reverse brake LR/B and the reverse brake R/B are engaged. With the engagement of the reduction brake RD/B, the third planetary gear set 7 is set in a reducing transmission condition. With the engagement of the reverse clutch R/C and the low reverse clutch LR/C, the first sun gear 5S is integrally rotated with the input shaft 1, and the first carrier 5C is fixed. Accordingly, the first ring gear 5R, the second carrier 6C and the intermediate shaft 3 are rotated in the reverse direction to the rotating direction of the input shaft 1. This rotating power is transmitted to the output shaft 2 upon being decreased in speed, and therefore a reverse speed is obtained.

In FIG. 1A, various pressure values, which indicate operation pressure values applied to friction elements, are designated by reference character P with various suffixes. Hereinafter, such pressure values will be discussed in brief.

The low clutch L/C, whose engagement in fifth speed causes interlock of the gear train (in fifth speed, the band brake B/B and the high clutch H/C are engaged), is normally disengaged, and is engaged at predetermined engagement pressure $P_{LCA}$. However, when disengagement pressure $P_{LCR}$ is applied to the low clutch L/C in the reverse direction to that of the engagement pressure $P_{LCA}$, even if the engagement pressure $P_{LCA}$ is applied to, the low clutch L/C is disengaged. Also, the reduction brake RD/B, whose engagement in fourth or fifth speed generates interlock of the gear train, is normally disengaged, and is engaged at a predetermined engagement pressure $P_{RDBA}$. When a predetermined disengagement pressure $P_{RDBR}$ is applied to the reduction brake RD/B in the direction opposite to that of the engagement pressure $P_{RDBA}$, even if the engagement pressure $P_{RDBA}$ is applied to, the reduction brake RD/B is disengaged.

Figure 2:
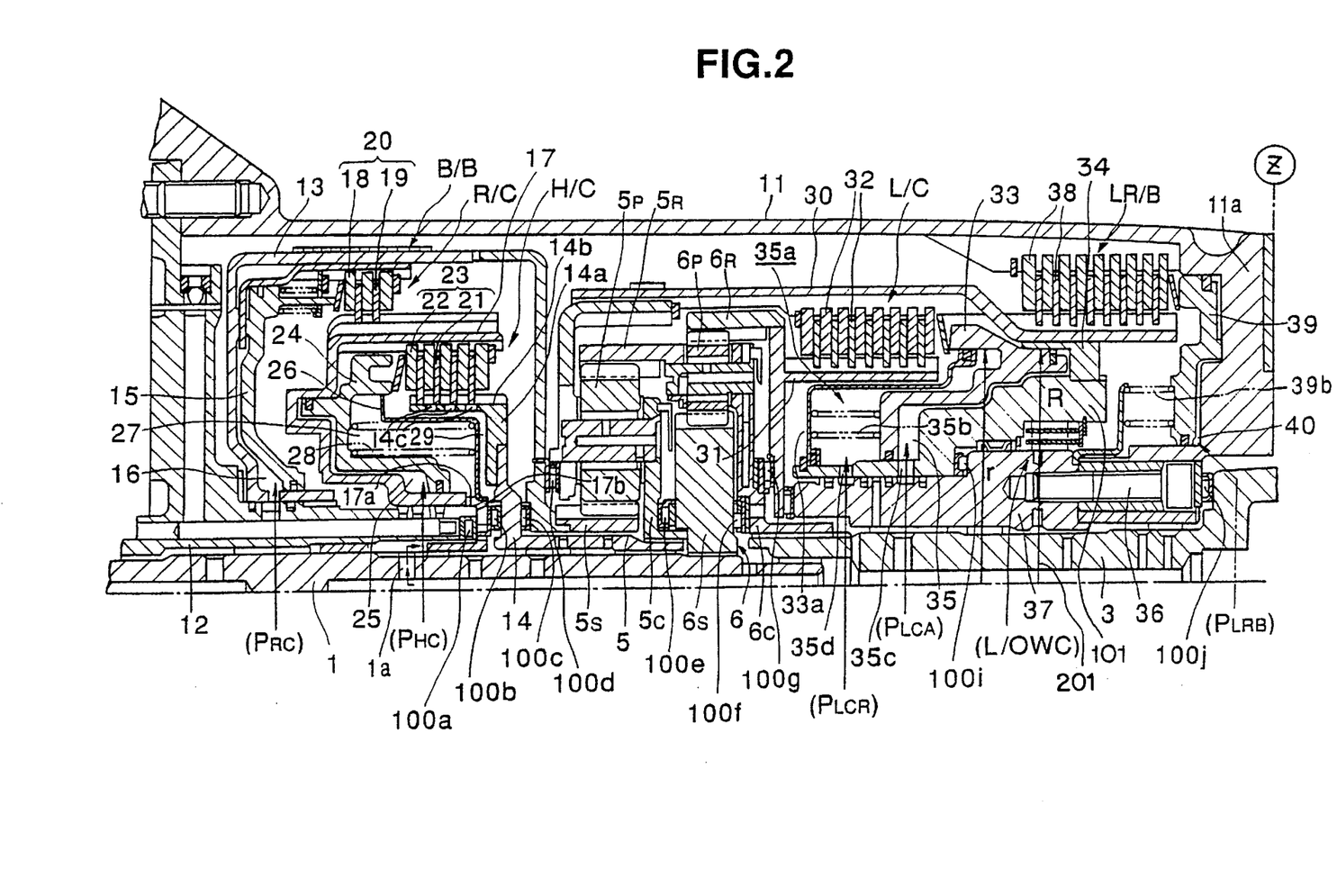
FIG. 2 is a cross-sectional view of a main part of the automatic transmission according to the present invention.
Figure 3:
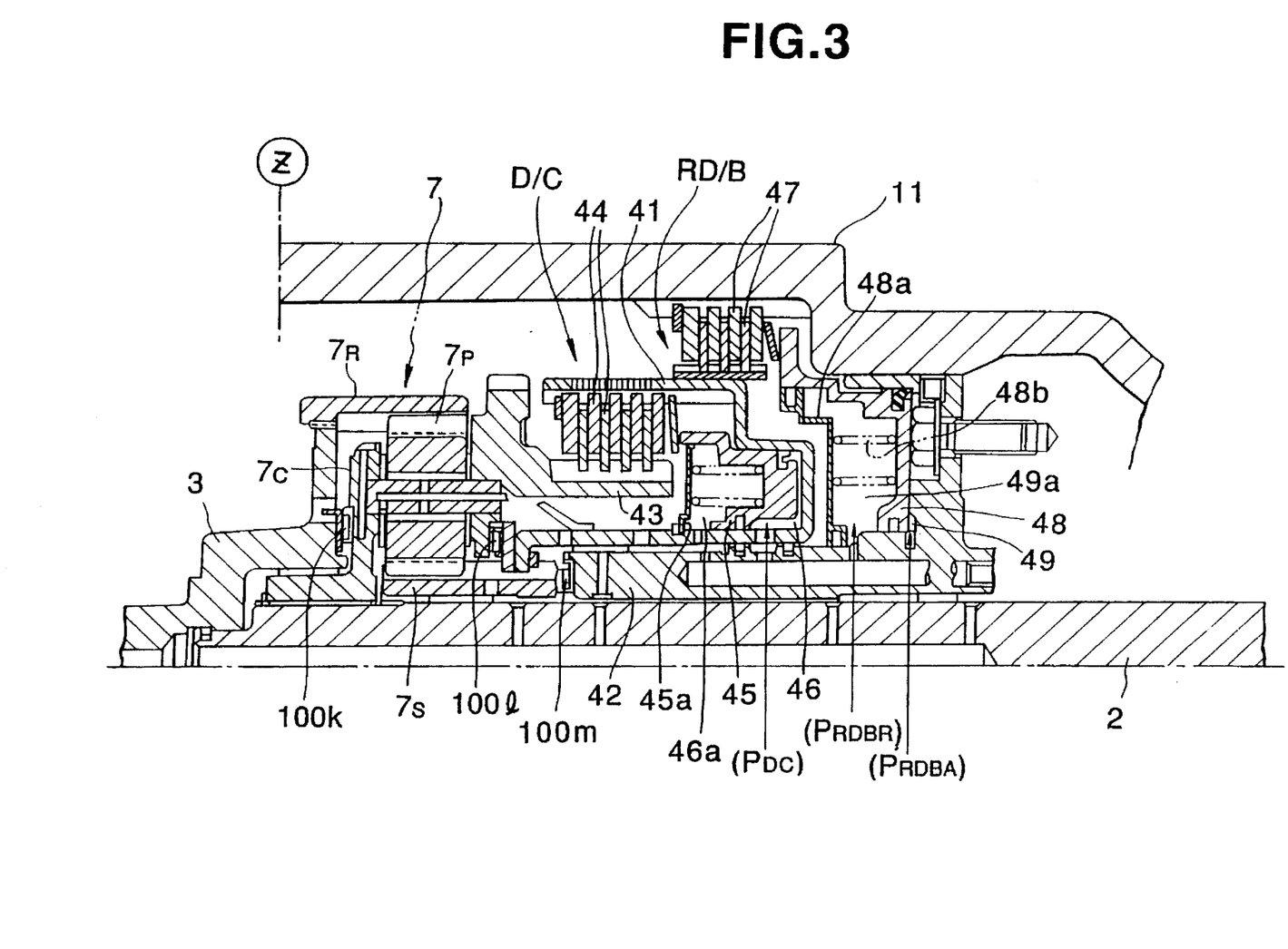
FIG. 3 is a cross-sectional view of the other part of the automatic transmission according to the present invention.

As shown in FIGS. 2 and 3, the input, intermediate and output shafts 1, 3, and 2 are coaxially aligned while being in turn contacted with butt joint, and disposed in a transmission case 11. The input, intermediate and output shafts 1, 3, and 2 are relatively rotatable with each other. The input shaft 1 is rotatably inserted in a tubular fixing shaft 12. The first and second planetary gear sets 5, 6 are coaxially located around an output side of the input shaft 1. The second sun gear 6S is fixed to the input shaft 1 with serration engagement. The second carrier 6C is connected to the first ring gear 5R and fixedly connected to the intermediate shaft 3 with serration engagement. The first sun gear 5S is connected with an end of a drum 13 which is rotatably supported on the tubular fixing shaft 12. A clutch hub 14 is rotatably supported on the input shaft 1 and connected to the first carrier 5C with serralion engagement.

The band brake B/B is positioned around an outer side of the drum 13. A piston 15 is slidably mounted in the drum 13 so as to define a chamber 16 therewith. An inner drum 17 is coaxially positioned inside of the drum 13. Outer friction plates 18 and inner friction plates 19 are alternately splined to the drum 13 and the inner drum 17 so as to form a clutch pack 20 therebetween. When the engagement pressure $P_{RC}$ is applied to the chamber 16, the friction plates 18 and 19 are pushed by the piston 15, and the reverse clutch R/C is set in an engaged state.

The inner drum 17 is rotatably supported on the tubular fixing shaft 12 and connected to the input shaft 1 with serration engagement. The clutch hub 14 has a hub disc 14a which extends in the radial direction, and a cylinder 14b which is connected to an outer periphery of the hub disc 14a and coaxially positioned inside of the inner drum 17. The cylinder 14b has a plurality of lubricating through-holes 14c. Outer and inner friction plates 21 and 22 are alternately splined to the cylinder 14b and the inner drum 17 so as to form a clutch pack 23 therebetween. A piston 24 is slidably mounted in the drum 17 and defines a chamber 25 with the drum 17. When the engagement pressure $P_{HC}$ is applied to the chamber 25, the friction plates 21 and 22 are pressed by the piston 24, and the high clutch H/C is set in an engaged condition. A partition wall 26 is disposed opposite to the piston 24 apart from the chamber 25 so as to form a centrifugal pressure cancel chamber 27. A return spring 28 is disposed in the centrifugal pressure cancel chamber 27 at a compressed condition.

The high clutch H/C is engaged in a manner that the piston 24 pushes the friction elements 21 and 22 while biasing to the return spring 28 by supplying operating pressure $P_{HC}$ to the chamber 25. The clutch pack 23 is positioned so as to surround the cancel chamber 27, and the cylinder portion 14b has a plurality of lubricating through-holes 14c. The clutch disc 14a is extended along a partition wall 26 and defines a lubricating oil passage 29 therebetween. In order that an operating fluid supply passage to a radial direction hole 1a of the input shaft 1 and the cancel chamber 27 including a hole 17a formed at an inner peripheral portion of the drum 17 communicates with the lubricating oil passage 29 at a just before portion of the hole 17a, a hole 17b is formed at the inner peripheral portion of the drum 17. With this engagement, the first carrier 5C fixed to the clutch hub 14 with serration engagement is drivingly connected to the input shaft 1 fixed to the drum 17 with serration engagement.

Under a condition that the pressure $P_{HC}$ is not supplied to the chamber 25, the piston 24 is pushed rightward in FIG. 2 due to the centrifugal force pressure generated in the chamber 25 according to the rotation of the clutch. Similarly, operating fluid in the cancel chamber 27 receives a centrifugal force pressure which is generated according the rotation of the clutch and acts to push the piston 24 leftward in FIG. 2. Thus, the centrifugal force pressure generated in the cancel chamber 27 operates to cancel the centrifugal force pressure generated in the chamber 25. This solves a phenomenon such that the clutch 23 is dragged due to the pushing of the clutch plates 21, 22 by the piston 24 although the clutch is disengaged.

The operating fluid is supplied from a hole 1a of the input shaft 1 through a hole 17a formed at the inner portion of the drum 17 to the cancel chamber 27 as shown by arrows in FIG. 2. To the friction plates 21 and 22, the operating fluid is supplied from the hole 17a through a hole 17b, a clutch pack oil passage 29 and a through-hole 14c. The hole 17b is formed to communicate the clutch pack oil passage 29 and the hole 1a supplying operating fluid.

Since a major part of the lubrication oil passage for the friction plates 21 and 22 is shared with that of the passage for the cancel chamber 27, passages for hydraulic system are largely facilitated. Furthermore, since the clutch pack oil passage 29 is defined between the partition wall 26 and the hub disc 14a, the supplement of the operating fluid to the clutch pack 23 is smoothly carried out without causing trouble in lubrication.

A drum 30 is drivingly connected to the first carrier 5C and extends rearward so as to cover the first and second planetary gear sets 5 and 6. Outer and inner friction plates forming a clutch pack 32 are alternately splined to an inner surface of the drum 30 and an outer surface of a clutch hub 31 extending from the second ring gear 6R. The low clutch L/C is constituted by the clutch pack 32 and a piston 33. The second ring gear 6R is supported by the low clutch L/C in the radial direction. The drum 30 forms a part of the low clutch L/C and the low reverse clutch LR/C. The clutch hub 31 is integrally connected to a disc 6a of the second ring gear 6R and extends from the second ring gear 6R in the axial direction. The clutch hub 31 is coaxially disposed inside of the drum 30. The clutch pack 32 is splined to the clutch drum 30 and clutch hub 31. The drum 30 is rotatably supported on a tubular fixing shaft 37 through the cylinder 34 integrally connected to the drum 30. Accordingly, the clutch hub 31 is offset from an engaging position of the second ring gear 6R.

The piston 33 is slidably mounted in a cylinder 34 connected to the drum 30 and defines an apply chamber 35 therebetween. A partition wall 33a is disposed opposite to the apply chamber 35 relative to the piston 33. An outer periphery of the partition wall 33a is slidably contacted with the piston 33, and an inner periphery of the partition wall 33a is fixedly connected to the cylinder 34. A cancel and release chamber 35a is defined between the piston 33 and the partition wall 33a. An return spring 35b is disposed in the chamber 35 in a compressed state so as to resiliently support the piston 33 at the clutch disengaged position as shown in FIG. 2. A port 35c is communicated with the apply chamber 35 to supply operating pressure. A port 35d is communicated with the cancel and release chamber 35a to supply operating pressure. An inner surface of the cylinder 34 is rotatably supported on the tubular fixing shaft 37 which is connected to the transmission case 11 by means of bolts 36. Accordingly, the cylinder 34 is prevented from rotating in the reverse rotating direction of the engine by the low one-way clutch LOW/C disposed between the cylinder 34 and the tubular fixing shaft 37.

The tubular fixing shaft 37 rotatably supports the intermediate shaft 3. A partition wall 33a and the piston 33 define a cancel and release chamber 35a to which the disengagement pressure receiving surface of the piston 33 is opposed. Accordingly, the low clutch L/C is engaged when the piston 33 pushes the friction elements in the clutch pack 32 in response to the engagement pressure to the apply chamber 35 against the return spring 35. In this condition, when disengagement pressure $P_{LCR}$ is applied to the chamber 35a, the piston 33 is returned and the low clutch L/C is disengaged.

The low reverse brake LR/B and the clutch piston 33 are located to be in contact with a surface which is perpendicular to the axis of the transmission. A brake pack 38 in which outer plates and inner plates are alternately arranged, is splined to a transmission case 11 and the drum 30 so as to be located therebetween. The drum 30 is formed so as to become small in diameter at a portion where the brake pack 38 is connected, as compared with the other portion. A piston 39 is slidably fitted with an end wall 11a of the transmission case 11 and defines an apply chamber 40. A spring seat 39a is sandwiched between the transmission case 11 and the tubular fixing shaft 37. A return spring 39 is compressedly disposed between the spring seat 39a and the piston 39 so as to resiliently support the piston 39 at a brake released position as shown in FIG. 2.

The low one-way clutch L/OWC is positioned between the cylinder 34 and the tubular fixing shaft 37. An outer race 101 of the low one-way clutch L/OWC is not integral with the cylinder and engaged with an inner surface of the cylinder 34.

When the operating pressure is not supplied to the apply chamber 35, the piston 33 is biasingly supported to the return spring 35b as shown in FIG. 2. Accordingly, the clutch pack 32 is not pushed by the piston 33 and therefore the low clutch L/C is put into a disengaged condition. In this condition, when the operating pressure is supplied to the apply chamber 35 through the port 35c, the piston 33 is moved against the return spring 35c to push the clutch pack 32 and therefore the low clutch L/C is put into the engaged condition. In this condition, a rotating member (not shown) connected to the drum 30 is connected to the second ring gear 6R, and the low one-way clutch L/OWC operates to prevent the reverse rotation of the second ring gear 6R. Accordingly, the automatic transmission selects a first speed.

When in first speed, in the event that the engine is forced to be reversely rotated during cruising, the low one-way clutch L/OWC is in a racing and does not transmit the reverse driving force to the engine. Accordingly, it is not possible to obtain engine brake. When engine brake is desired, it is necessary to put the low reverse brake LR/B into the engaged condition in a manner to push the brake pack 38 by the piston 39 due by means of the supplement of the operating pressure to the apply chamber 40. With this operation, the racing of the low one-way clutch L/OWC is prevented and the drum 30 connected to the first carrier 5C is fixed. This enables engine brake to be operated.

When the release pressure $P_{LCR}$ is supplied to the cancel and release chamber 35a through the port 35d under the engaged condition of the low clutch L/C, the piston 33 is returned to a position shown in FIG. 2 due to the pushing force by the cancel chamber 35a and a biasing force of the return spring 35b. Accordingly, the low clutch L/C is put into disengaged condition and therefore it becomes possible to proceed shifting to a corresponding shift speed by engaging other friction element.

When operating pressure is not supplied to the apply chamber, that is, when the clutch is in disengaged condition, centrifugal pressure generated in the apply chamber 35 according to the rotation of the low clutch L/C pushes the piston 33 against the return spring 35b and therefore the clutch pack 32 is slightly pushed. This causes the drag of the low clutch L/C.

However, then the centrifugal pressure is generated in the cancel and release chamber 35a and operates to forbid the stroke of the piston by functioning to cancel the centrifugal pressure in the apply chamber 35. Accordingly, the clutch in a disengaged condition is prevented from generating drag due to the centrifugal pressure in the apply chamber 35.

Since the low clutch L/C and the low reverse clutch LR/C are connected to the drum 30 to which the first carrier 5C to be connected or fixed to the second ring gear 6R is connected, it becomes possible to facilitate a brake hub which is necessary in a conventional structure. Accordingly, it becomes possible to reduce the number of the parts and therefore improves the assemblity and the lowering of the production cost. Furthermore, the axial length of the transmission is shortened by the locationing of the brake pack 38 and the piston 33 of the low clutch L/C which are positioned to be in contact with a surface perpendicular to the transmission axis.

Furthermore, since the low one way clutch L/OWC is located between the tubular fixing shaft 37 and the cylinder 34 engagingly connected to the drum 30, similarly it becomes possible to shorten the axial length of the transmission.

Additionally, since the outer race 101 of the low one-way clutch L/OWC is not integral with the cylinder and engaged with an inner surface of the cylinder 34, the clutch cylinder is prevented from receiving an initial large input shock to the low one way clutch L/OWC. This enables the cylinder to be formed by [a press worked part]. Furthermore, since it becomes possible to previously assemble the clutch piston 33 and the outer race of the low one way clutch relative to the clutch cylinder, the assembly operation is largely improved.

Outer radial r of the pressure receiving surface facing to the cancel and release chamber 35a of the piston 33 is determined to be the same as outer radial R of the pressure receiving surface facing to the apply chamber 35. A port 35c communicates with the apply chamber 35 and supplies operating pressure to the apply chamber 35 therethrough. A port 35d communicates with the cancel and release chamber 35a and supplies operating pressure to the cancel and release chamber 35a therethrough.

When the disengagement pressure $P_{LCR}$ is supplied to the cancel and release chamber 35a through the port 35d under a low clutch L/C engaged condition, the piston 33 is returned to an original position as shown in FIG. 2 due to the disengagement pressure $P_{LCR}$ and the biasing force of the return spring 35b even if operating pressure is applied to the apply chamber 35. Accordingly, the low clutch L/C is disengaged so as to enable shifting to a corresponding shift speed.

In a clutch disengaged condition in that the operation pressure is not applied to the apply chamber 25, centrifugal force is generated in the apply chamber 35 according to the rotation of the low clutch L/C and pushes the piston 33 biasing to the return spring 35b. Further, the friction plates 8 and 9 of the clutch pack 32 are pushed, and thereby the drag of the low clutch L/C tends to be produced. However, then, another centrifugal force is generated in the cancel and release chamber 35a and functions to cancel the centrifugal force in the apply chamber 35 so as to forbid the stroke of the piston 33. Accordingly, the drag of the low clutch L/C under a clutch disengaged condition is prevented.

Since the outer diameter of the pressure receiving surface facing to the cancel and release chamber 35a is the same as that of the pressure receiving surface facing to the apply chamber 35, the piston pushing force due to the centrifugal force in the apply chamber 35 and the pushing force due to the centrifugal force in the cancel and release chamber 35a are just balanced with each other. Accordingly, the drag of the low clutch L/C is perfectly avoided, and the other trouble such as the prevention of the operation of the piston 33 due to the centrifugal force in the release chamber 35a is also avoided.

Furthermore, it becomes possible to disengage the low clutch L/C in a manner to apply the disengagement pressure $P_{LCR}$ into the release chamber 35a while applying operation pressure to the apply chamber 35. This operation is applied to a shifting mode of the automatic transmission. Outer and inner friction elements are alternately splined between the drum 30 and the transmission case 11 and forms a brake pack 38. The low reverse brake LR/B is constituted by the brake pack and a piston 39. The piston 39 is engaged with the transmission case 11 and defines a chamber 40. The low reverse brake LR/B is engaged when engagement pressure $P_{LRBA}$ is applied to the chamber 40 and the piston 39 pushes the brake pack 39.

Referring to FIG. 3, the third ring gear 7R is connected to the rear end of the intermediate shaft 3, and the third carrier 7C is fixed to the output shaft 2 with serration engagement. A drum 41 is connected to the third sun gear 7S which is rotatably engaged with the output shaft 2. The drum 41 is rotatably supported on a tubular fixing shaft 42 which is integrally connected to the transmission case 11. The tubular fixing shaft 42 also rotatably supports the output shaft 2. The third carrier 7C is integrally connected to a clutch hub 43 positioned inside of the drum 41. A clutch pack 44, which is formed by alternately arranged outer and inner friction elements, is splined to the outer surface of the clutch hub 43 and the inner surface of the drum 41. A piston 45 is slidably mounted in the drum 41 and defines a chamber 46 with the drum 41. The direct clutch D/C is constituted by the piston 45 and the clutch pack 44. A centrifugal pressure cancel chamber 46a is defined by a partition wall 45a and the piston 45. The direct clutch D/C is engaged when engagement pressure $P_{DC}$ is applied to the chamber 46, and the piston 45 pushes the clutch pack 44.

A brake pack 47, which is formed by alternately arranged outer and inner friction elements, is splined to the outer surface of the drum 4 and the inner surface of the transmission case 11. The reduction brake RD/B is constituted by the brake pack 47 and a piston 48. The piston 48 is slidably mounted in the tubular fixing shaft 42 and defines an apply chamber 49. A release chamber 49a is defined by the piston 48 and the partition wall 48a so as to be opposite to the apply chamber 49 relative to the piston 48. The reduction brake RD/B is engaged when engagement pressure $P_{RDBR}$ is applied to the apply chamber 49, and the brake pack 47 is pushed according to the engagement pressure $P_{RDBR}$. In this condition, when release pressure $P_{RDBR}$ is applied to the release chamber 49a, the piston 48 is returned and the reduction brake RD/B is disengaged. In FIGS. 2 and 3, reference numerals 100a–100m designate thrust bearings.

Since the second ring gear 6R is supported in the radial direction at an offset point relative to the engaging point of the second ring gear due to the brake pack 32, the supporting rigidity relative to the engagement force is sufficiently improved and it is expected to obtain a vibration reduction effect due to the friction between the clutch plates 8a, 8b.

Figure 4:
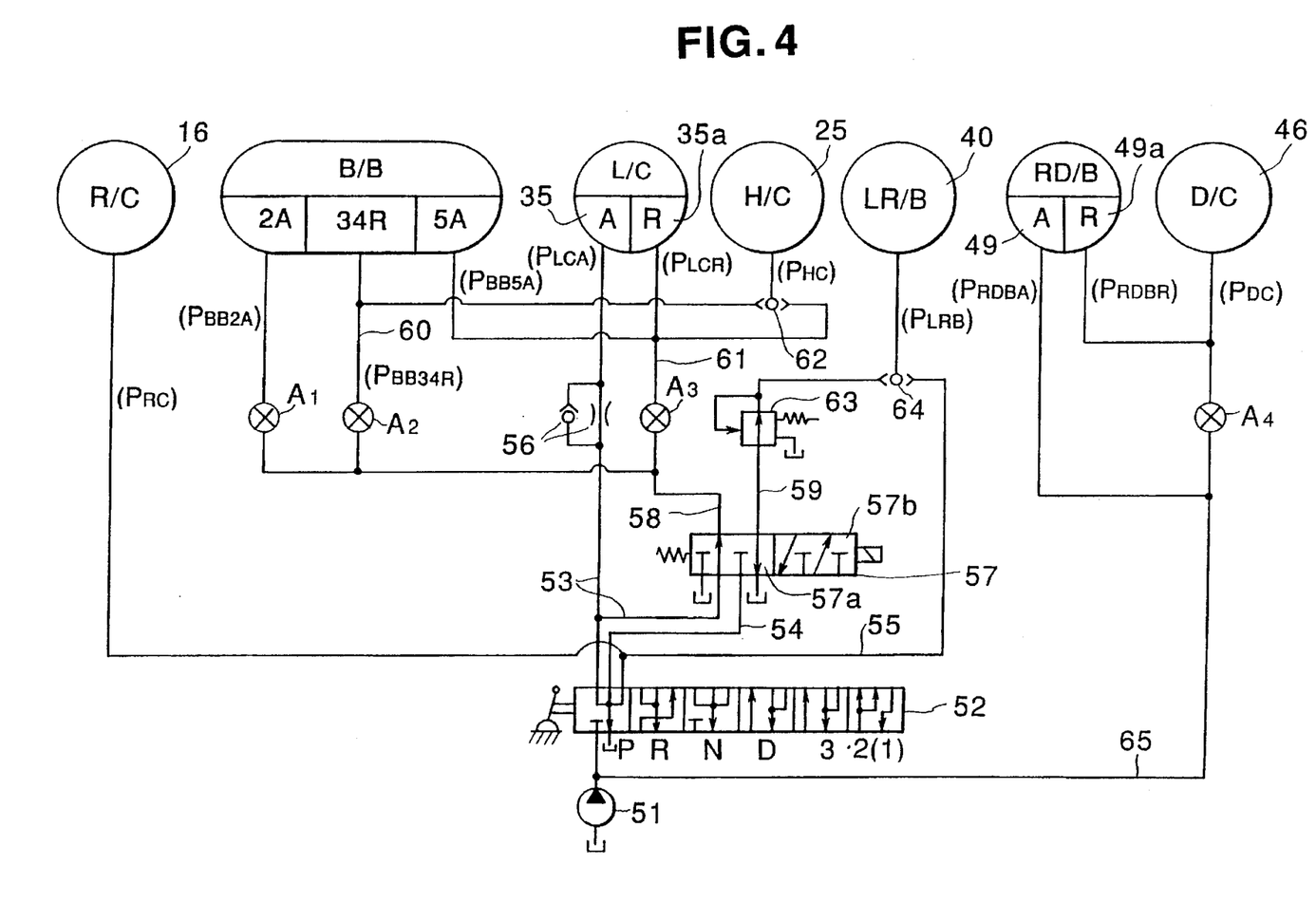
FIG. 4 is a circuit diagram showing a transmission control hydraulic circuit of the automatic transmission according to the present invention.

FIG. 4 shows a hydraulic circuit for shift control of the gear train shown in FIGS. 1 to 3. A pressure source 51 usually generates a predetermined pressure and supplies it to a manual valve 52. The manual valve 52 is manually operated by a driver in accordance with a desired cruising pattern and selected into one of P, R, N, D, 3, 2, 1 ranges. The manual valve 52 outputs line pressure $P_L$ to circuits 53, 54 and 55 in accordance with a selected range.

The circuit 53 is communicated with the apply chamber 35 of the low clutch L/C through a one-way orifice 56. The circuit 54 and a branch of the circuit 53 are communicated with the first speed engine-brake selector valve 57. The selector valve 57 is a solenoid selector valve which takes a first port position 57a shown in FIG. 4 in a turned off state and takes a second port position 57b in FIG. 4 in a turned on state. An output circuit of the selector valve 57 is communicated with a second speed apply chamber 5A of the band brake B/B, a third speed, fourth speed release chamber 34R, a release chamber 35a of the low clutch L/C through duty solenoid valves A1, A2 and A3. Each of output circuits 60, 61 of the duty solenoid valves A2, A3 is communicated with two inputs of the shuttle valve 62. Output of the shuttle valve 62 is communicated with the chamber 25 of the high clutch H/C. The output circuit 61 is further communicated with a fifth speed apply chamber 5A of the band brake B/B. The band brake B/B is usually disengaged, and engaged when pressure $P_{BB2A}$ is applied to a chamber 2A. Further, in this pressure applied condition, when pressure $P_{BB34R}$ is applied to a chamber 34R, the band brake B/B is disengaged. In addition, when the pressure $P_{BB5A}$ is applied to the chamber 5A, the band brake B/B is engaged.

The low clutch L/C is usually disengaged and is engaged when pressure $P_{LCA}$ is applied to the chamber 35. In this pressure applied condition, when pressure $P_{LCR}$ is applied to the chamber 35a, the low clutch L/C is disengaged.

Another output circuit 59 of the selector valve 57 is communicated with one of two inputs of the shuttle valve 64 through 1 range pressure reduction valve 63. The other input of the shuttle valve 64 is communicated with the circuit 55. The chamber 16 of the reverse clutch R/C is communicated with the circuit 55.

The line pressure $P_L$ from the pressure source 51 is communicated with the chamber 46 of the direct clutch D/C through the duty solenoid valve A4. One port of the valve A4 is communicated with the apply chamber 49 of the reduction brake RD/B, and the other port of the valve A4 is communicated with the release chamber 49a of the reduction brake RD/B. The reduction brake RD/B is usually disengaged, and engaged when pressure $P_{RDBA}$ is applied to the chamber 49. In this condition, when pressure $P_{RDBR}$ is applied to the chamber 49a, the reduction brake RD/B is disengaged.

The manner of operation of the transmission control hydraulic circuit will be discussed hereinafter with reference to FIG. 4.

P, N range

When the manual valve 52 is put in P or N range in accordance with a driver's request for parking or stopping, the circuits 53 to 55 are drained off, and the reverse clutch R/C, the band brake B/B, the low clutch L/C, the high clutch H/C and the low reverse clutch LR/C are disengaged by applying no pressure thereto. Then, the rotating power of the engine does not reach the intermediate shaft 3, and therefore the output shaft is not rotated. This enables parking or stopping.

Line pressure $P_L$ is usually supplied to the circuit 65 and reaches the apply chamber 49 of the reduction brake RD/B as pressure $P_{RDBA}$. At that time, the pressure $P_{RDBR}$ to the release chamber of the reduction brake RD/B and the pressure $P_{DC}$ to the chamber 46 of the direct clutch D/C are set to zero by controlling the duty of the duty solenoid valve A4 to 0%. Accordingly, the reduction brake RD/B is engaged while the direct clutch D/C is disengaged. With this operation, the third planetary gear set 7 connects the intermediate shaft 3 with the output shaft 2 in a reduction transmitting condition.

D, 3 range (First Speed)

When the manual valve 52 is put in D or 3 range in accordance with a driver's request for automatic transmitting or third-speed engine-braking cruising, line pressure $P_L$ is supplied to the circuits 53. At this range, the first-speed engine-brake selector valve 57 is turned off and takes the first port position 57a to supply line pressure to the circuit 58. The line pressure of the circuit 53 is supplied to the apply chamber 35 of the low clutch L/C through the one-way orifice 56 as a pressure $P_{LCA}$. Although the line pressure of the circuit 58 is supplied to the duty solenoid valves A1, A2 and A3, the output pressures $P_{BB2A}$, $P_{BB34R}$, $P_{LCR}$, $P_{BB5A}$, $P_{HC}$ of the valves become 0 by setting the duty of the valves to 0%. Accordingly, the low clutch L/C is engaged, and the band brake B/B and the high clutch H/C are disengaged. On the other hand, since the duty of the duty solenoid valve A4 is set at 0% as is similar to that in P or N range, the reduction brake RD/B is engaged and the high clutch H/C is disengaged. Accordingly, the third planetary gear set 7 is kept at a reduction speed transmitting condition. This enables the selection of the first speed and the starting of the vehicle.

(Second Speed)

When the cruising condition forces a selection of the second speed, the pressure $P_{BB2A}$ is supplied to the second speed serve apply chamber 2a of the band brake B/B by gradually increasing the duty of the solenoid valve A1. Accordingly, the band brake B/B is additionally operated (engaged) while the low clutch L/C keeps its engagement. This enables the automatic transmission to be set at the second speed.

(Third Speed)

When the cruising condition forces a selection of the third speed, the pressure $P_{BB34R}$ is supplied to the third speed/ fourth speed release chamber 34R of the band brake by increasing the duty of the duty solenoid valve A2. Accordingly, the band brake B/B is disengaged. In that time, the pressure $P_{BB34R}$ is supplied as a pressure $P_{HC}$ to the chamber 25 of the high clutch H/C through the shuttle valve 62, and therefore the high clutch H/C is engaged. This causes deployment of the friction elements that the band brake B/B is engaged and the high clutch H/C is engaged, enabling a selection of the third speed.

(Fourth Speed)

When the cruising condition forces a selection of the fourth speed, the duty solenoid valves A1 to A3 are set to be the same states at the third speed, and the pressure $P_{RDBR}$ to the release chamber 49a of the reduction brake RD/B and the pressure $P_{DC}$ to the chamber 46 of the direct clutch D/C are increased by gradually increasing the duty of the solenoid valve A4. This causes redeployment of the friction elements that the reduction brake RD/B is disengaged and the direct clutch D/C is engaged. Accordingly, the state of the third planetary gear set 7 is changed from a reduction speed transmission condition to the direct transmission condition so as to enable a selection of the fourth speed. In 3 range, a shifting to the fourth speed or fifth speed is forbidden and enables the third speed engine brake cruising.

(Fifth Speed)

When the cruising condition forces a selection of the fifth speed, the pressure $P_{LCR}$ is supplied to the release chamber 35a of the low clutch L/C and the pressure $P_{BB5A}$ is supplied to the fifth speed apply chamber 5A of the band brake B/B by increasing the duty of the duty solenoid valve A3. With this operation, the low clutch L/C is disengaged and the band brake B/B is engaged. This enables change to the fifth speed.

2, 1 range

When the manual valve 52 is put in 2 or 1 range according to a driver's request for the second-speed or first-speed engine-brake cruising, line pressure $P_L$ is supplied to the circuits 53 and 54. With this operation, the low clutch L/C is engaged to be the same as that in D or 3 rang. On the other hand, the duty of the duty solenoid valve A4 is set at 0%, and therefore the direct clutch D/C is disengaged and the reduction brake RD/B is engaged so as to set the third planetary gear set 7 in a reducing transmission condition. At this state, if it is desired to select 2 range, a driver turns off a manual switch (not shown) to put the valve 57 into the first port position 57a. With this operation, line pressure communicates with the duty solenoid valve A1 through the circuit 58. Accordingly, the band brake is engaged by the turning-on of the valve A1 and disengaged by the turning-off of the valve A1. This enables a selection of second or first shift as is similar to that in D or 3 range. In this 2 range, the duty solenoid valves A2 and A3 are kept in OFF state so as to forbid shifting to the third speed or more. Accordingly, the second engine brake cruising is realized.

If 1 range is desired, a driver turns on the manual switch (not shown) to put the valve 57 into the second port position 57b. With this operation, line pressure is supplied as a pressure $P_{LRB}$ to the chamber 40 of the low reverse brake LR/B through the circuit 59, the 1 range reduction valve 63 and the shuttle valve 64 so as to engage the low reverse brake LR/B. On the other hand, since the valve 57 operates the circuit 58 to be drained off, the band brake B/B and the high clutch H/C are kept in disengagement and the low clutch L/C is engaged, enabling the first-speed engine-brake cruising.

R range

When the manual valve 52 is put into R range according to a driver's request for reverse, line pressure is supplied only to the circuit 55. Since the circuits 53 and 54 are in a drained off condition, the low clutch L/C, the band brake B/B and the high clutch H/C, which are of friction elements for forward cruising, are disengaged. Line pressure in the circuit 55 is supplied as operating pressure $P_{RC}$ to the chamber 16 of the reverse clutch R/C and is applied supplied as an operating pressure $P_{LRB}$ to the chamber 40 of the low reverse clutch LR/C through shuttle valve 64. Accordingly, the reverse clutch R/C and the low reverse clutch LR/C are engaged.

At R range, the direct clutch D/C is disengaged and the reduction brake RD/B is engaged by setting the duty of the duty solenoid valve A4 at 0%. Accordingly, the third planetary gear set 7 is put into a reduction speed transmission state. Therefore, the reverse shift speed is obtained to enable reverse cruising.

Figure 5:
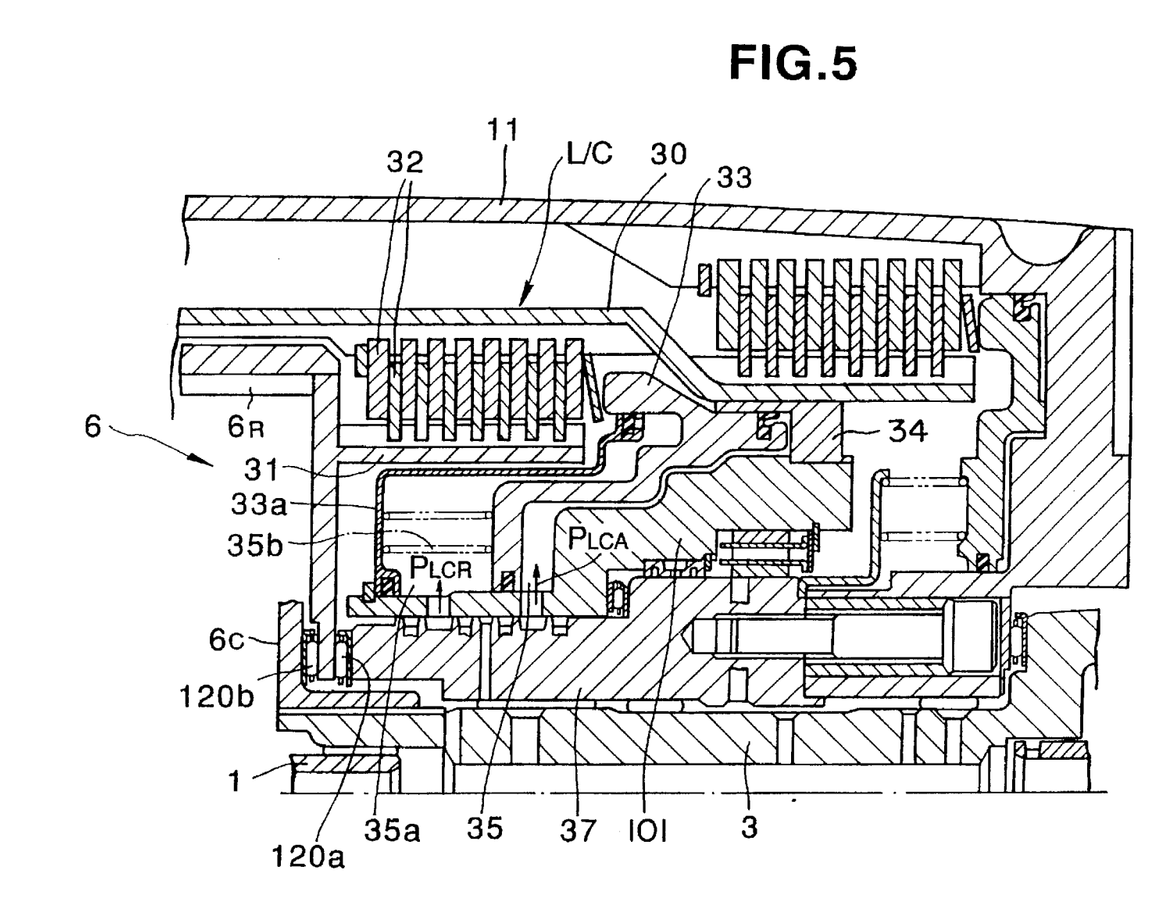
FIG. 5 is a cross-sectional view of another embodiment of the automatic transmission according to the present invention.

Referring to FIG. 5, there is shown a second embodiment of the automatic transmission according to the present invention which is similar to the first embodiment except that the supporting structure of the second ring gear 6R. An inner peripheral portion of the second ring gear 6R is sandwiched between axially opposite surfaces of the second carrier 6C and the tubular fixing shaft 37. A pair of thrust bearings 120a and 120b, which are arranged to have the same diameter and axis, are positioned so as to axially support the inner peripheral portion of the second ring gear 6R.

With this arrangement, a problem that the supporting rigidity of the second ring gear 6R is not changed even if pushing force is applied to the second ring gear 6R in any direction. This prevents the inclined bending of the ring gear and the degradation of the engagement between gears. Consequently, it becomes possible to suppress the gear noise and its derivation.

What is claimed is:

1. An automatic transmission having a gear train Which is provided with a plurality of rotating members, the automatic transmission comprising:

a cylindrical drum connected with one of the rotating members;

a clutch connecting the one rotating member to another one of the rotating members, said clutch being disposed inside of said cylindrical drum;

a brake by which the one rotating member is fixable, said brake being disposed outside of said cylindrical drum;

a clutch piston for engaging said clutch by its pushing operation, said clutch piston being generally coaxial with said brake such that said clutch piston and said brake are in contact with a surface perpendicular to an axis of the automatic transmission;

a cylinder which is disposed between said clutch piston and a fixing shaft rotatably supported around the axis, said cylinder being engaged with said cylindrical drum; and a low one-way clutch for limiting rotation of the one rotating member into one rotating direction, said low one-way clutch being disposed between the fixing shaft and said cylinder.

2. An automatic transmission as claimed in claim 1, wherein said one-way clutch is operatingly connected to an outer race to which said cylinder is connected.

3. An automatic transmission as claimed in claim 1, wherein an outer race of said low one-way clutch has a surface which is slidably contacted with said piston.

4. An automatic transmission as claimed in claim 1, wherein said low one-way clutch is generally concentrically disposed with said cylinder further comprising a cylinder.

* * * * *